United States Patent [19]
Fleischer

[11] 3,971,079
[45] July 27, 1976

[54] BABY HOLDING DEVICE

[76] Inventor: Henry Fleischer, 18 Notch Park Road, Little Falls, N.J. 07424

[22] Filed: Mar. 10, 1975

[21] Appl. No.: 556,554

Related U.S. Application Data
[62] Division of Ser. No. 406,620, Oct. 15, 1973.

[52] U.S. Cl. .................................... 5/97; 5/93 R; 296/28 B
[51] Int. Cl.² ...................... B62B 9/12; A47C 27/08
[58] Field of Search .................... 5/93, 97–98 R, 5/99 R; 296/28 B, 78 A

[56] References Cited
UNITED STATES PATENTS

| | | | |
|---|---|---|---|
| 1,594,256 | 7/1926 | Greene | 5/97 |
| 2,369,552 | 2/1945 | Ferran | 5/99 B |
| 2,401,605 | 6/1946 | Boren | 5/97 |
| 2,634,432 | 12/1950 | Ehrenberg | 5/99 R |
| 2,688,997 | 9/1954 | Miller | 5/98 R |
| 3,780,387 | 12/1973 | Propst | 5/97 |
| 3,799,606 | 3/1974 | Gesslein | 5/93 R |
| 3,871,701 | 3/1975 | Gesslein | 5/93 R |
| 3,878,570 | 4/1975 | Donnelly | 5/97 |

Primary Examiner—Casmir A. Nunberg

[57] ABSTRACT

A portable baby holding device is provided which may take the form of a combination baby carriage, stroller, infant seat, car seat, car bed, bassinet, high chair and the like and comprises baby carrier means and baby shielding or protective means movably connected to said carrier means, for protecting the baby from severe or inclement weather while the baby is being held in said carrier means. The baby shielding means may comprise a plastic, metal, and/or cloth canopy, which is adapted to completely cover the baby. The carrier means includes a collapsible frame and baby holding means supported on the frame.

25 Claims, 26 Drawing Figures

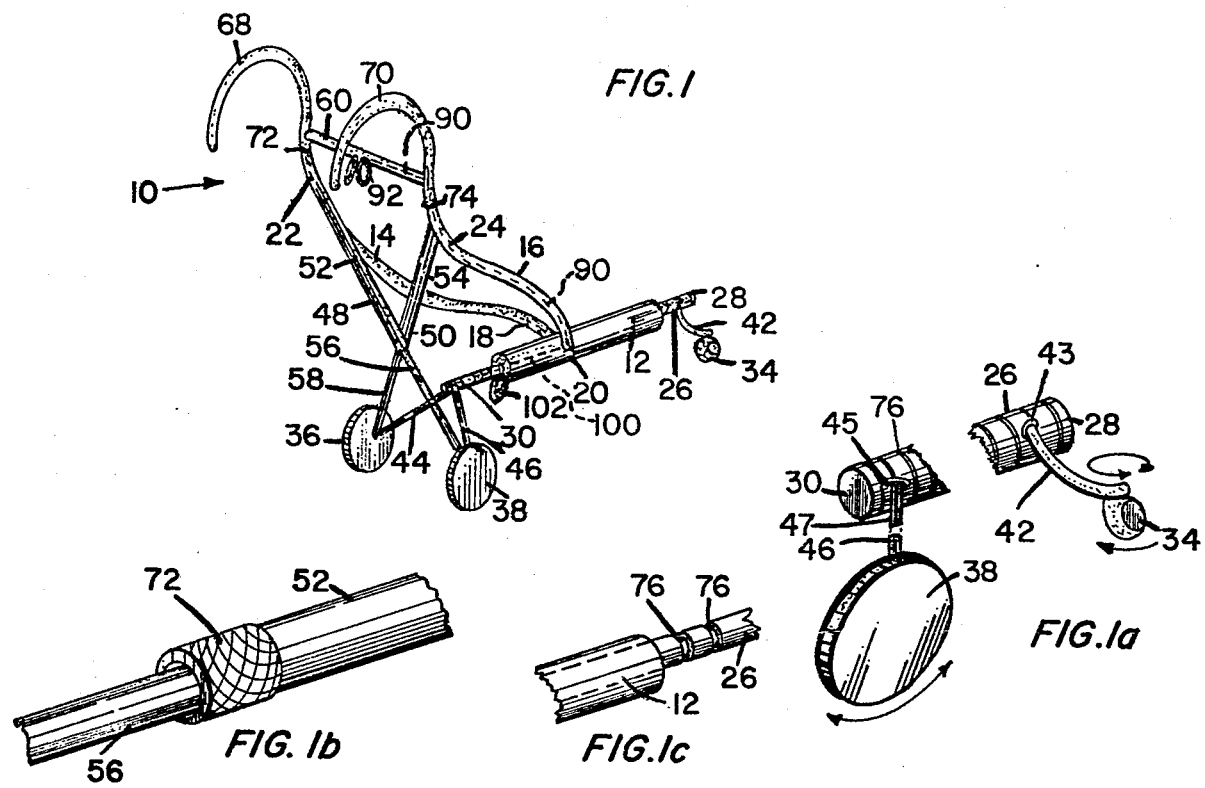
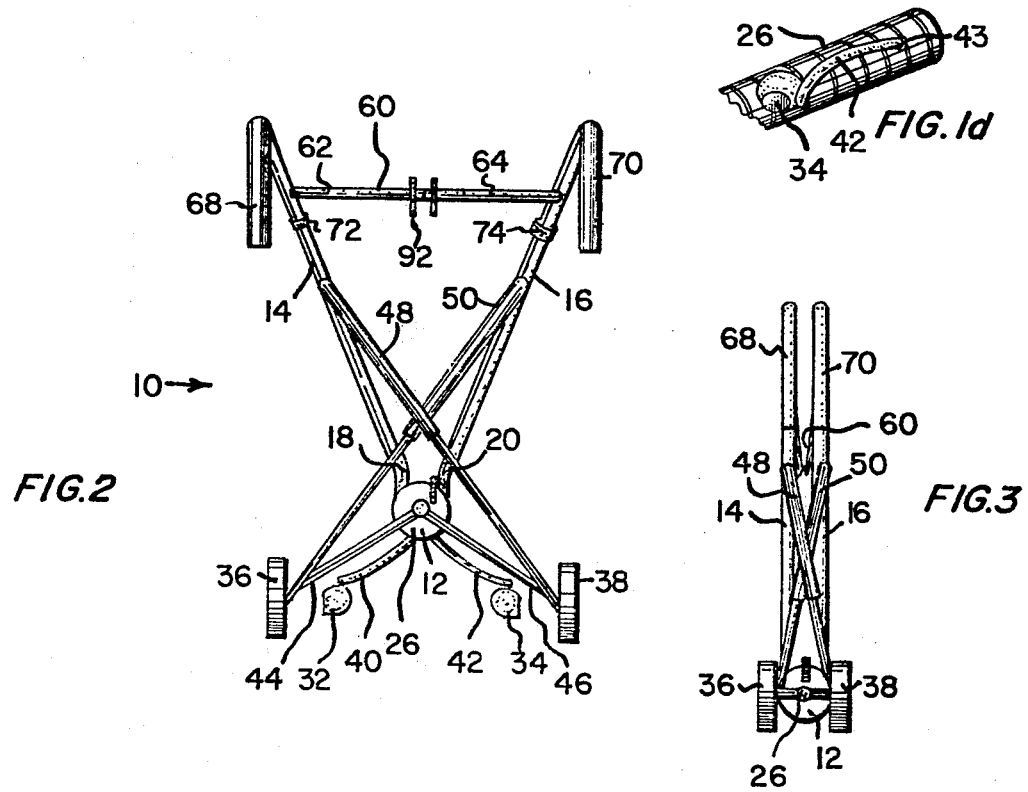

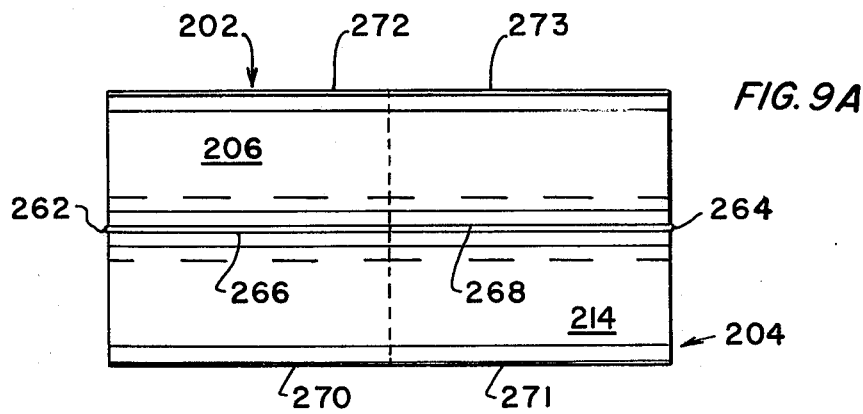
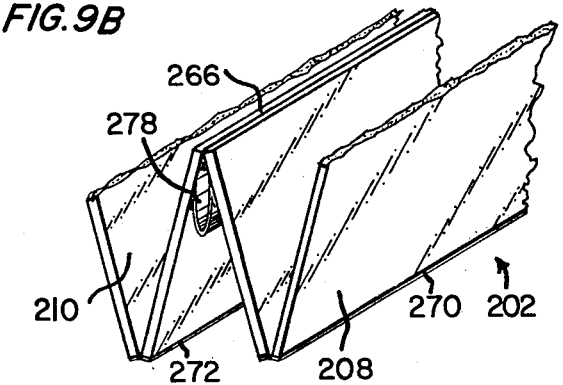
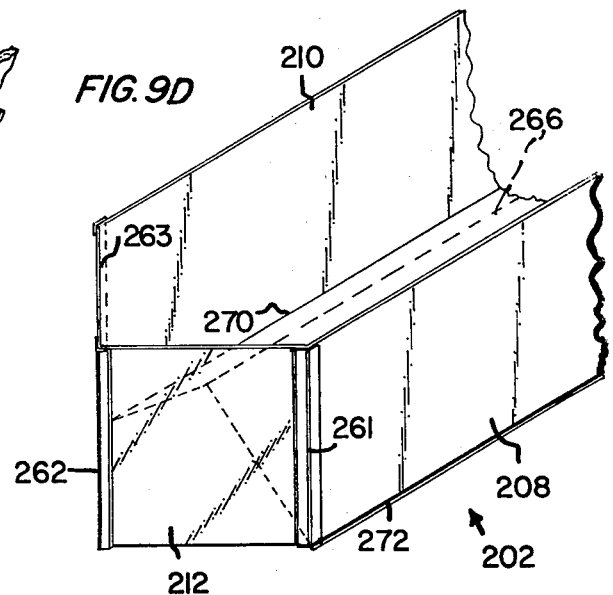
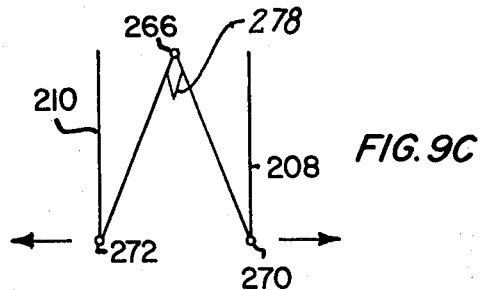
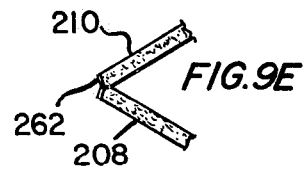
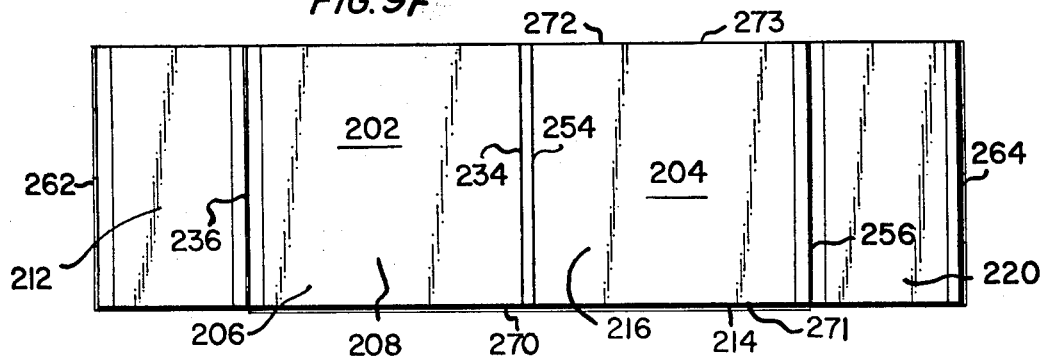

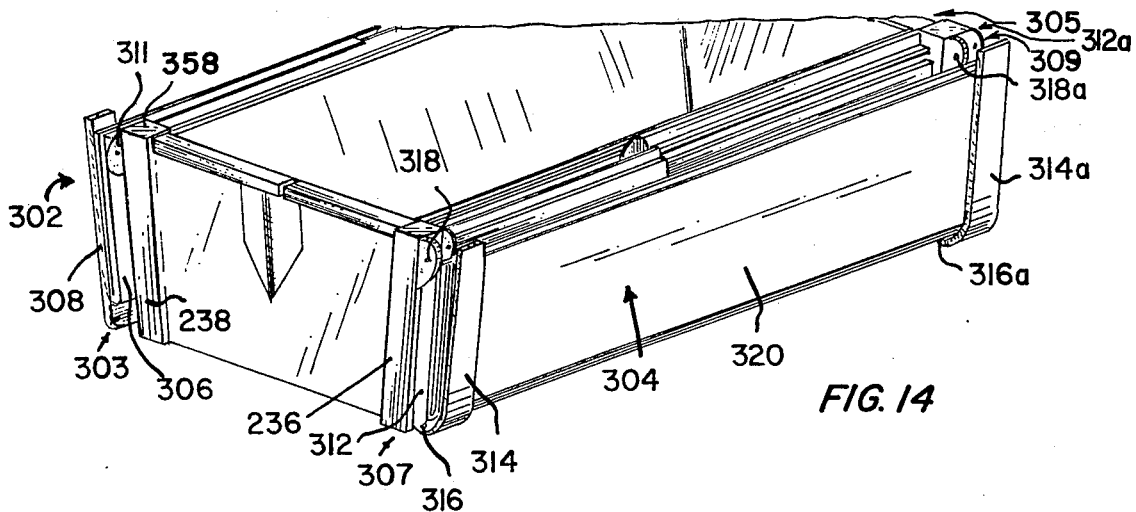
FIG. 14
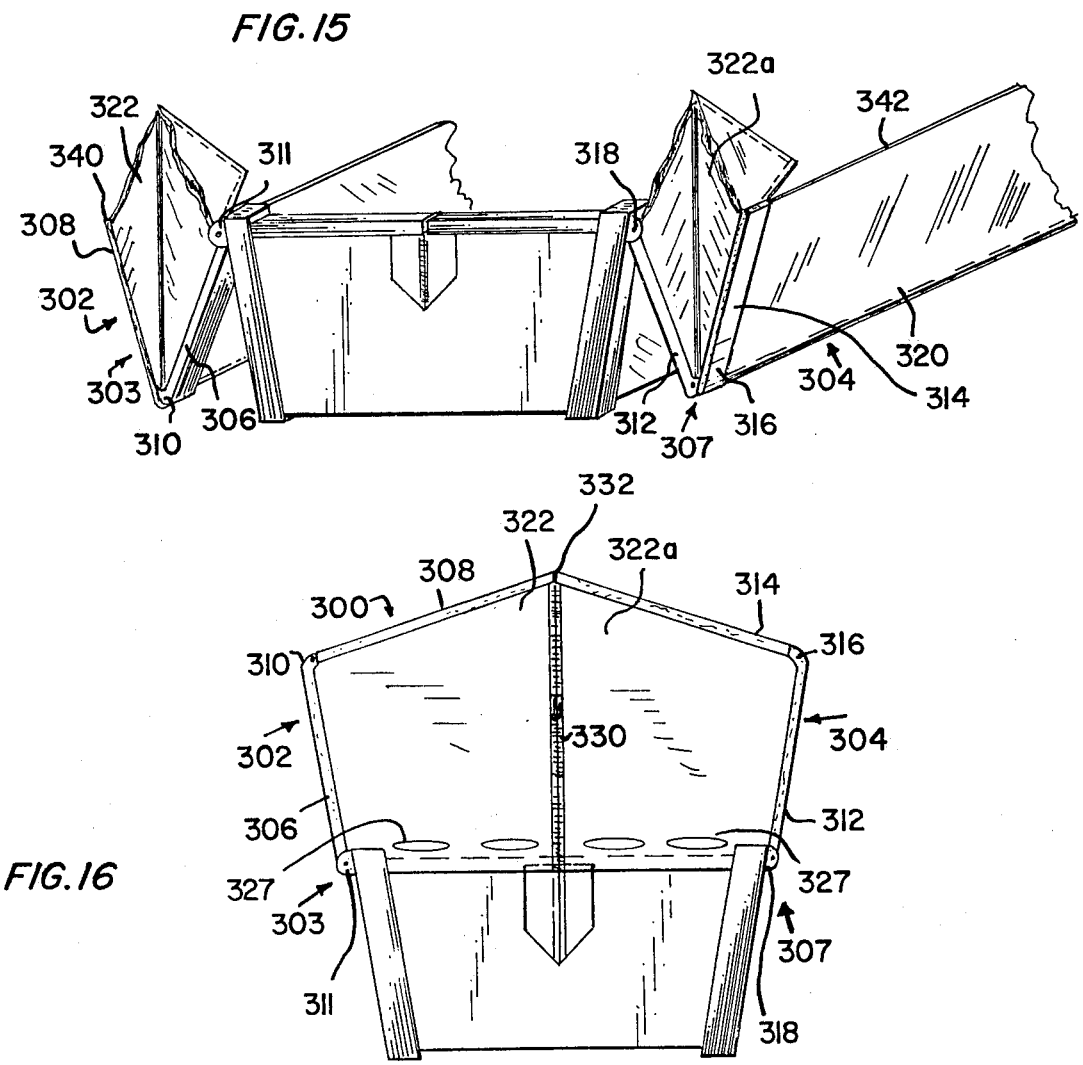
FIG. 15
FIG. 16

BABY HOLDING DEVICE

REFERENCE TO OTHER APPLICATIONS

This application is a division of application Ser. No. 406,620 filed Oct. 15, 1973.

FIELD OF THE INVENTION

The present invention relates to a portable baby holding device which is designed to function as a combination car seat, car bed, stroller, carriage, infant seat, bassinet, high chair and the like and which includes shielding or protective means to protect the baby while being held in said holding device.

BACKGROUND OF THE INVENTION

Today, more than ever, people are on the move travelling by car, for the most part, to different places near and far. The presence of an infant or baby usually has not impeded such travel. In fact, an entire industry has developed geared to the design and production of baby carrying or moving devices to facilitate travel with an infant. Some of the presently existing baby carrying or moving devices are disclosed in the patent art and are as follows.

U.S. Pats. No. 2,864,429 to Combs, U.S. Pat. No. 3,645,548 to Briner and U.S. Pat. No. 3,669,492 to Peterson disclose baby or infant car seats. These seats are adapted to be employed in an automobile such as by hooking the seats on top of the back of a car seat as disclosed in Briner, U.S. Pat. No. 3,645,548, by hooking the infant seat in the crevice formed between the back of the automobile seat and the automobile seat itself, or by attaching the infant seat to the dashboard as disclosed in Combs, U.S. Pat. No. 2,864,429. Other types of infant seats are disclosed in U.S. Pat. No. 3,101,972 to Laughlin, U.S. Pat. No. 3,206,247 to Johnson and U.S. Pat. No. 3,290,092 to Howard. The infant seats disclosed in these patents are portable and can be carried into a car and connected to the automobile seat or merely made to rest on the automobile seat.

Many other types of combination infant seats and car seats are also known, such as disclosed in U.S. Pat. No. 3,206,247 to Johnson and U.S. Pat. No. 3,528,701 to Laughlin. In addition, combination infant car seats and strollers are also known such as disclosed in U.S. Pats. No. 2,803,468 to Thompson, U.S. Pat. No. 3,083,997 to Chreist, U.S. Pat. No. 3,549,164 to Raynor and U.S. Pat. No. 3,550,998 to Boudreau et al.

Other portable combination units are known such as the combination bed and seat as disclosed in U.S. Pat. No. 3,115,364 to Berlin, and the combination chair, or car seat as disclosed in U.S. Pat. No. 3,400,976 to Messier. In addition, infant carbeds are known such as those disclosed in U.S. Pat. No. 3,579,674 to Blais et al.

There is no question that the infant carrier means, such as those described in the above-mentioned patents fulfill a great need and are extremely useful in moving an infant from one location to another location. However, all of the above carrier means or moving means have a common disadvantage, namely, they do not provide protection to the infant when the infant is being moved, for example, from indoors to an outdoor location or to another indoor location, during inclement weather. In fact, until now, it appears that no infant carrier means are available which include shielding means for shielding the infant from inclement or severely cold weather.

The concept of providing shielding means for chairs or like articles is known. For example, U.S. Pat. No. 2,166,832 to Wenker discloses a sun shade attachment for deck chairs. U.S. Pat. No. 2,243,984 to Singlewald discloses a combination folding chair, canopy and sun shade. However, the shielding means disclosed in these patents would not appear to be useful for protecting or shielding an infant or other person seated in such chairs from inclement weather or cold weather.

It is known to provide shielding means for ski lift chairs, such as disclosed in U.S. Pats. No. 2,985,224 to Sowder, U.S. Pat. No. 3,008,761 to McIlvaine and U.S. Pat. No. 3,556,014 to Rudkin. However, the shielding means disclosed in these patents are of somewhat complicated design and would not be readily adaptable for use in conjunction with an infant carrier.

BRIEF STATEMENT OF THE INVENTION

In accordance with the present invention, there is provided a portable baby holding device which includes shielding or protective means to protect the baby from inclement weather while the baby is being held in the holding device.

The shielding means may comprise a canopy or other type covering or shield which protects the baby held in the baby carrier means from the surrounding environment and especially from inclement weather or severely cold weather. The canopy can comprise a solid plastic one piece or multiple piece member which is hingedly connected to the baby carrier means in a manner such that the canopy can be moved between an open unprotecting position and closed protecting position or can be easily removed from the carrier means and stored until needed.

The canopy shielding means may also comprise a fabric cover or canvas-like cover which is adapted to completely enclose a baby carrier means. Such fabric cover may comprise one, two or even four or more pieces which are adapted to be joined together to completely enclose the baby carrier means. The fabric cover pieces can be joined together by any conventional means such as by zippers, snaps and the like.

The shielding means or canopy can also take the form of a cockpit-type enclosure wherein the canopy comprises two pieces, a front piece and a back piece and wherein the front piece telescopes with the back piece. In addition, the canopy may also comprise an accordian type covering member.

Further in accordance with the present invention, there is also provided a collapsible baby holding device comprising a collapsible primary frame and baby holding means supported in the frame. The frame includes a primary support member, a pair of secondary support members having first and second end portions, for supporting said baby holding means, said first end portions of said pair of said secondary support members being pivotally connected to the primary support member, and the second end portions of the secondary support members are spaced from each other and are adapted to move toward each other as such secondary support members are pivoted on the primary support member. A wheel support member having first and second end portions is disposed in contact with the primary support member and preferably is disposed within such primary support member with the first and second end portions of said wheel support member extending from the ends of the primary support member. At least one front wheel and preferably two front wheels are rotatably connected to the wheel support member in close proximity to the first end portion thereof. A pair of back wheels are rotatably connected to the wheel support member in close proximity to the second end portion thereof. The frame also includes at least a pair of cross members connected to the pair of secondary support members for supporting such members as well as for supporting the back wheels.

In preferred embodiments, the primary support member comprises a tubular member and the wheel support member comprises an elongated member disposed within said tubular member. Furthermore, the pair of cross members comprise rod-like members which are adjustable in length. For example, the pair of cross members may comprise telescoping rod-like members comprising a first tubular member and a second rod-like member adapted to slide in and out of said first tubular member to thereby adjust the length of the pair of secondary support members according to the height of the user.

The frame may also include a third cross member connected to each of said pair of secondary support members adapted to retain the second end portions of the secondary support members in spaced relation to each other. The third cross member may comprise a pair of elongated members each having first and second end portions, the first end portions of each being connected to the pair of secondary support members and the second end portions of each being pivotally connected to each other or to a release or locking mechanism, the purpose of which will be described in detail hereinafter.

The primary support member will also include locking means in operative connection with the first end portions of the secondary support members in order to fix such secondary support members at any desired angle to the primary support member. In addition, the primary support member will include locking means for locking the position of the wheel support member. As will be described in detail hereinafter, when it is desired to collapse the frame, the locking means disposed within the primary support member is released and the third cross member disposed between the pair of secondary support members is pivoted so as to allow the secondary support members to move toward each other. The cross members mentioned above are adjusted (e.g. telescoped) so as to move the second rod-like member into the first tubular member thereby further allowing the pair of secondary support members to be reduced in length and to be moved toward the primary support member and the front and back wheels are pivoted up towards the primary support member. The frame is thereby collapsed thereby making it easy to handle and store.

The ends of the secondary support members may terminate or be connected to hook-like members which are adapted to fit over the back of a seat or other supporting member.

The baby holding means which is supported on the frame, may comprise any conventional type of infant seat or similar article. In an alternative embodiment, the baby holding means may comprise a support frame and a body portion supported by such support frame. The body or support frame will include securing means for movably securing the baby holding means to any desired position on the secondary support members of the primary frame mentioned above. Such securing means may comprise one or two pairs of brackets connected to the bottom corners of the body support frame, such brackets being adapted to engage corresponding baby holding device support members connected to the secondary support members. The securing brackets may take the form of arc-shaped members which include a plurality of teeth along the arc for securing the baby holding means to the frame at any desired angle thereto.

In addition, in accordance with the present invention, there is provided a collapsible baby holding means or carrier comprising a first section and a second section, each of said sections including a bottom wall, a pair of side walls and one end wall, the first section being adapted to be telescopically and slidably positioned within the second section to form a four-sided box or object with the one end wall of each of said sections facing each other and spaced from each other by the side and bottom walls of each. Each of the first and second sections may include hinges or like members for facilitating collapsing of the sections for easy handling and storage.

In order to connect the two sections to each other and to insure that the sections will remain in proper alignment with each other, each of said first and second sections may include one or a pair of tracks or channel members connected to the side walls of each, the track members of the first section being adapted to be engaged in and move along the track members of the second section to facilitate positioning of one of said sections with respect to the other. Furthermore, to insure proper alignment, one of said sections may include a second track and the other of said sections may include a bearing member adapted to ride on said second track when the track members of said first and second sections are engaged with each other.

The collapsible body holding device means or carrier described above may also include the shielding means or canopy as described above.

The collapsible baby holding device including the collapsible frame and the baby holding means supported on the frame which preferably includes shielding or protecting means as described hereinbefore, actually comprises a combination infant seat, infant bed or carbed, stroller, carseat, carriage, bassinet, or high chair, which can be utilized either inside or outside of an automobile, and is so constructed that it can be converted into any one of the above type infant support articles or carriers, as will be described in detail hereinafter.

BRIEF DESCRIPTION OF THE FIGURES

FIG. 1 is a perspective view of a collapsible frame in accordance with the present invention;

FIGS. 1A, 1B, 1C and 1D represent portions of the collapsible frame shown in FIG. 1, FIG. 2 is an end view of the collapsible frame shown in FIG. 1;

FIG. 3 is an end view of the collapsible frame shown in FIG. 1 in its collapsed position;

FIG. 9A is a plan view of the baby carrier means shown in FIG. 9;

FIG. 9B–9E are various views of portions of the baby carrier means shown in FIG. 9 in a partially collapsed state.

FIG. 9F is a side view of the baby carrier of FIG. 9 in its collapsed state.

FIG. 14 is a perspective view of the baby carrier means in accordance with the invention shown in FIG. 13 with the shielding means in its collapsed position;

FIG. 15 is a partial perspective view of an end portion of the baby carrier means including shielding means as shown in FIG. 14;

FIG. 16 is an end view of the baby carrier means shown in FIG. 13.

DESCRIPTION OF THE FIGURES

Figure 4:
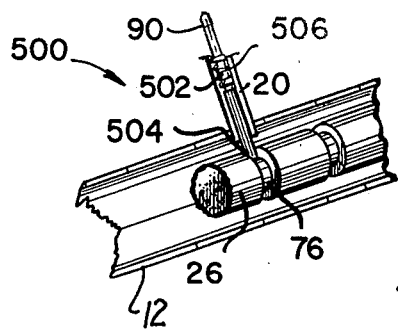
FIG. 4 is a perspective view of a portion of the collapsible frame shown in FIG. 1 partially broken away.

Referring to the Figures, wherein like parts are represented by like numerals in the several views, in FIG. 1, there is shown a collapsible frame generally indicated by the numeral 10, for supporting baby holding means in accordance with the present invention. The frame 10 comprises a primary support member 12 which preferably takes the form of a tubular-like member having a central passage running therethrough. A pair of secondary support members indicated generally by the numerals 14 and 16 are pivotally connected at ends 18 and 20, respectively, thereof to the primary support member 12 as shown in FIGS. 1 and 2. The other end portions 22 and 24 of the secondary support members 14 and 16 are spaced from each other as shown.

Passing through the primary support member 12 is a wheel support member 26, which may comprise an elongated bar or rod. The ends 28 and 30 of the wheel support member 26 extend from the primary support member 12. A pair of front wheels 32 and 34 are adapted to be pivotally connected via front wheel connecting rods and axles 40 and 42, respectively, to the front end 28 of the wheel support member 26 and a pair of back wheels 36 and 38 are adapted to be pivotally connected via back wheel connecting rods and axles 44 and 46, respectively, to the back end 30 of the wheel support member 26. Each of the connecting rods 40, 42, 44 and 46 are preferably connected to the wheel support member 26 by conventional ball joints or other conventional pivot means, in order to facilitate pivoting of the wheels with respect to the wheel support member 26.

As shown in FIG. 1A, the front wheel connecting rod and axle 42 (as well as the other front wheel connecting rod and axle 44) may comprise a curved member one end of which is connected via a ball joint 43 to the wheel support member 26, the other end of which is connected to wheel 34 which preferably takes the form of a caster which swivels 360°. As will be seen hereinafter, the wheel 34 is adapted to be pivoted on the connecting member 42, so as to allow such wheel to be folded into the folded position illustrated in FIG. 1D, the purpose of which will be explained in detail hereinafter. It will be understood that both of the front wheels 32 and 34 are preferably casters and can be folded down into the position shown in FIG. 1A.

Further, as shown in FIG. 1A, the back wheel connecting rod and axle 46 (as well as the back wheel connecting rod and axle 44) comprises a connecting rod portion 47 one end of which is connected to the wheel support member 26 by conventional pivot means, such as a ball joint 45, and the other end of said rod portion 47 is connected to the wheel 38 by suitable conventional means.

A pair of cross members generally indicated by the numerals 48 and 50 are connected to each of the secondary support members 14 and 16, respectively, and to the wheel connecting members 44 and 46, respectively, (preferably to the axle portions thereof) as shown. The cross members 48 and 50 may comprise a pair of extendable members, which, as shown, includes tubular members 52 and 54 connected to secondary support members 14 and 16, respectively, and rod-like members 56 and 58 which are adapted to telescope in and slide in the tubular members 52 and 54, respectively, and are connected to the wheel connecting members 44 and 46, respectively, as shown.

It will be understood that the cross members 48 and 50 need not comprise telescoping members but may be formed of any conventional extendable members such as wherein one member rides in a track of another member, or where two members are connected to each other in a manner such that an outside surface of each are contiguous and adapted to slide past each other.

A third cross member 60 is connected to the secondary support members 14 and 16 in order to support the same and keep them in spaced relation with respect to each other. The cross member 60 may preferably comprise a pair of rod-like members 62 and 64 which are hinged to each other at 66 so that the members 62 and 64 may be folded toward the back of the frame (and optionally toward the front of the frame) so as to allow the spaced apart secondary support members 14 and 16 to be moved toward each other. The other ends of the members 62 and 64 are pivotally connected to the secondary support members 14 and 16 in order to allow the folding of the members 62 and 64 as shown in FIG. 3.

Figure 6:
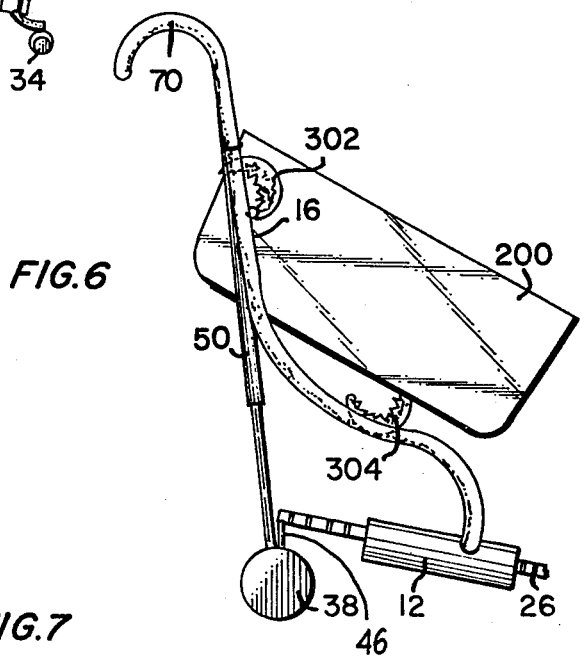

The ends of the secondary support members 14 and 16 terminate in hook-like members 68 and 70, respectively, which members are pivotally secured at portions 72 and 74 of members 14 and 16, respectively, to enable pivotable or rotational movement of the hook-like members 68 and 70 toward or away from the third cross member 60. Furthermore, the members 68 and 70 are preferably adapted to telescope within and out of support members 14 and 16, respectively, so that the height of the members 68 and 70 may be adjusted. The purpose of the hook-like member 68 and 70 is to secure the frame 10 to the back of a car seat or other support article, as shown in FIG. 6.

The cross members 48 and 50 will include means for setting the position of the individual tubular members 52 and 54 and the rod members 56 and 58 with respect to each other. Such means may comprise a threaded compression screw member or sleeve 72 (as shown in FIG. 1B) or slot and pin arrangement or any other conventional means as will be apparent to one skilled in the art. For example, by rotating the screw member 72 in a first direction, the screw member will cause the end portions of member 52 to clamp down on member 56 so that the positions of the tubular member 52 and the rod member 56 may be fixed relative to each other. Alternately, by rotating the screw member 72 in an opposite direction, the rod member 56 will be allowed to be moved into or out from the tubular member 52, as desired.

Figure 5:
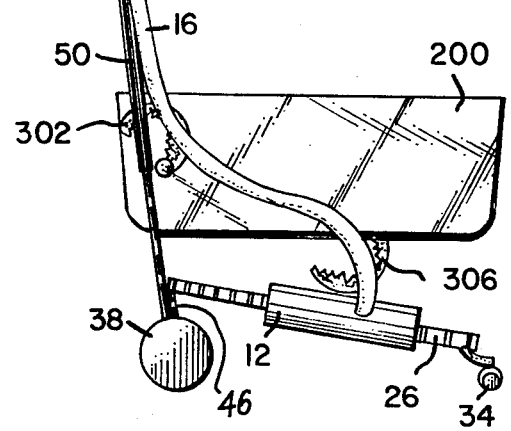
FIGS. 5 to 7 are side views of the collapsible frame shown in FIG. 1 including baby carrier or holding means supported on said frame.

The wheel support member 26, as indicated above, may be in the form of a rod-like member which as shown in FIGS. 1C, 4 and 5 may include a plurality of grooved or recessed portions 76. The ends 18, 20 of the secondary support members 14 and 16 or tongues or pins secured to such ends are adapted to be inserted in openings in the primary support member 12 and engage the recessed portions 76 of the wheel support member 26. It will thus be seen that the position of the wheel support member 26 can be adjusted with respect to the secondary support members 14 and 16 in any desired manner merely by moving the wheel support member 26 within the primary support member 12 to any desired position and then engaging the ends 18, 20 or a pin or tongue carried on such ends of the secondary support members 14 and 16 into the desired recesses 76 of the wheel support member 26.

The position or relative angles of the secondary support members 14 and 16 with respect to the horizontal and the primary support member 12 may be fixed or released by means of the locking means 500 shown in FIG. 4. Such locking means 500 may comprise an end and/or 20 of secondary support members 14 and 16, respectively, and a body portion 502 which includes spring-loaded tongue 504 connected to spring 506, which spring is connected to a link or cable member 90, such as a chain or wire indicated by the broken lines 90.

Link member 90 preferably snakes through one of the secondary support members 14, 16 (for example support member 16 as shown) and may also pass through the cross member 60. The end of the link member 90 is connected to a trigger or release type mechanism 92 which is disposed on the cross member 60. The release mechanism may comprise any conventional mechanism such as a pistol grip release trigger, as will be apparent to one skilled in the art, and merely functions to pull or release the link member 90 and thereby operate the locking device by moving the tongue 504 into and out of recess 76 of wheel support member 26, from a remote position convenient to the user.

When it is desired to collapse the frame 10, the user only need activate the trigger mechanism 92 thereby causing the link member 90 to open the locking device and allow the secondary support members 14 and 16 to be pivoted towards each other.

The position of the wheel support member 26 is fixed with respect to the primary support member 12, as indicated above, by the secondary support members 14 and 16 engaged therewith as well as by locking means 500. In order to release the locking means 500 so that the wheel support member 26 can be moved to any desired position within the primary support member 12, there is provided locking means including linking member 100 (shown as broken lines in FIG. 1) which is connected at one end to a trigger or release mechanism 102 as shown, and which is connected at the other end to a spring-loaded tongue as described above with respect to locking means 500.

The release mechanism 102 and its associated locking means can be connected to either the primary support member 12 or the wheel support member 26, and will function in substantially the same manner as release mechanism 92 and locking means 500.

If desired the same locking means may be employed to fix both the position of the wheel support member 26 in primary support member 12 and to fix the position of the secondary support members 14 and 16 with respect to the primary support member 12.

As seen in FIG. 1, in the preferred embodiment of the collapsible frame of the invention, the back wheel connecting rods 44 and 46 will be back-biased, that is rods 44 and 46 starting from the back wheels, will be biased backwards and upwards. In this manner, back wheels 36 and 38 will provide greater weight or load supporting stability to the frame 10. In addition, when the frame is collapsed, the back-bias of rods 44 and 46 will force the members 48 and 50 to move upwardly and inwardly toward the secondary support members 14 and 16.

Referring now to FIGS 9, and 9A–9E, there is shown a collapsible baby holding means or carrier employed in conjunction with the frame described in previous Figures. The collapsible baby carrier is generally identified by the numeral 200 and preferably comprises two separate sections, 202, 204, although a one piece carrier may also be employed as will be apparent to one skilled in the art.

The first section 202 comprises a bottom wall 206, a pair of side walls 208 and 210 and an end wall 212. As shown, the first section 202 is adapted to be telescopically and slidably positioned within the second section 204, which second section comprises a bottom wall 214, a pair of side walls 216 and 218 and an end wall 220. Thus, as shown, where the first section is telescopically and slidably positioned within the second section, a four-sided carrier is formed with the end walls 212 and 220 facing each other and spaced apart by the side walls and bottom walls of each of said sections 202 and 204. In the embodiments shown, where the first section 202 and second section 204 are moved towards each other, the bottom wall 214 of the second section 204 will be disposed below the bottom wall 206 of the first section 202.

Each of the first and second sections may be formed of plastic, fabric, metal, canvas or any other conventional material employed for forming such a carrier. The carrier 200 includes a metal or plastic (or other rigid material) frame along the side edges and end edges of each of the two sections 202 and 204, as shown. The frame of each section is preferably in the form of channels, including for the first section 202, upper side channels 222 and 224, lower side channels 226 and 228, upper end channel 230 and lower end channel 232 and vertical edge support channels 234, 236, 238 and 240. The second section 204 will include similar channel members, namely upper side channels 242 and 244, lower side channels 246 and 248 (not shown), upper end channel 250, lower end channel 252 and vertical edge support channels 254, 256, 258 and 260.

The body portions of carrier 200, disposed between said channel members may be formed of rigid or nonrigid materials such as plastic, metal, wood or natural or synthetic fabrics or canvas.

In order to facilitate folding or collapsing of the carrier 200, the end 212 of the first section 202 and the end 220 of the second section 204 will include vertically disposed hinges 262 and 264, respectively, and the bottom walls 206 and 214 of said first and second sections will include hinges 266 and 268, respectively. In addition, the vertical edge support channels 236 and 238 of the first section 202 and the vertical edge support channels 256 and 258 of the second section 204 will also include hinge members, namely hinges 261 and 263 hinging the side walls 208 and 210 to the end wall 212 of said first section 202 and hinges 265 and 267 hinging the side walls 216 and 218 to the end wall 220 of said second section 204.

It will be appreciated that inasmuch as the body portion of the carrier 200 can comprise a soft pliable fabric-like material, the above-mentioned hinge members may merely be located on the channel members 230, 232, 236 and 238 of the first section and 250, 252, 256 and 258 of the second section.

Figure 9:
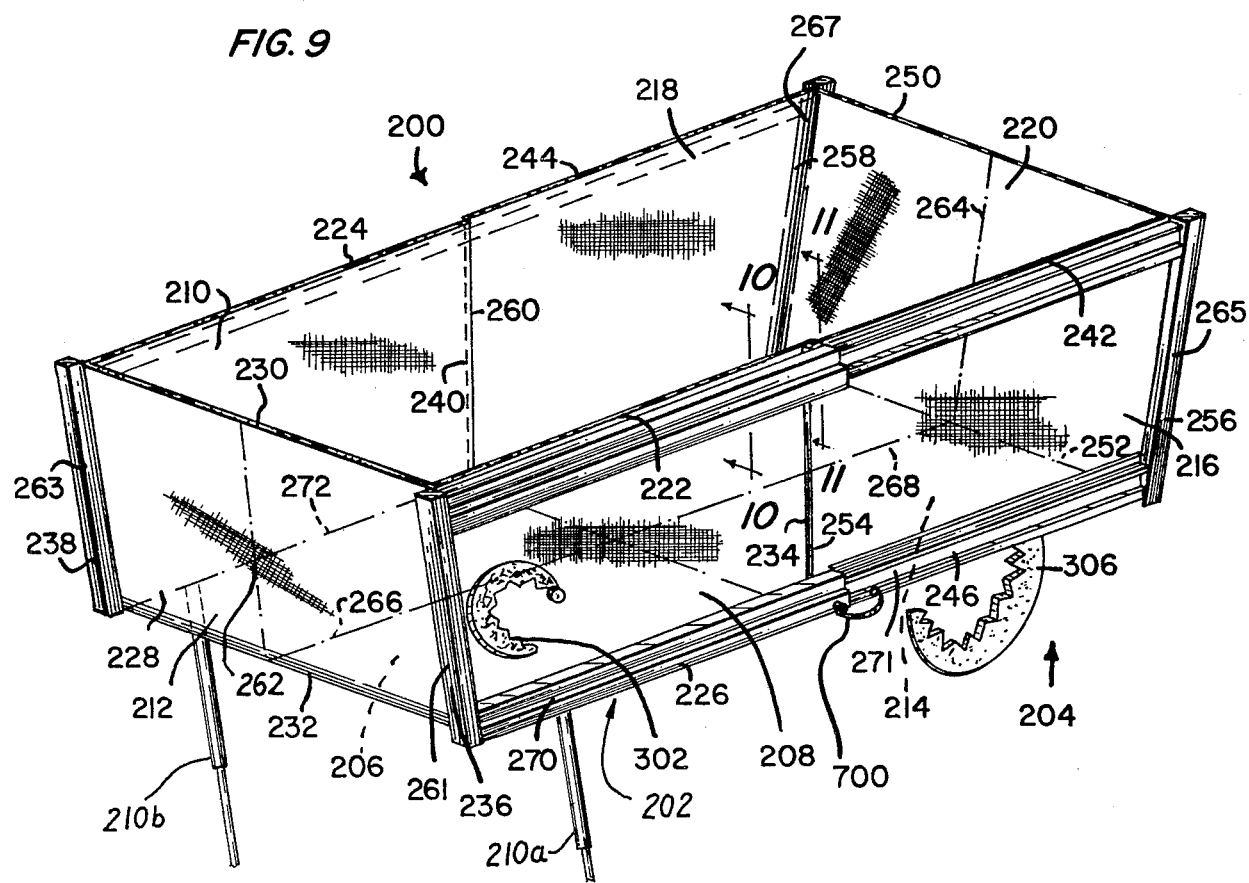
FIG. 9 is a perspective view of a baby carrier or holding means employed in conjunction with the collapsible frame as shown in FIG. 1.

It will also be appreciated that the bottom edges of each of said side walls of each of said sections may also include hinges to facilitate such folding or collapsing. This is shown in FIG. 9 which shows the bottom wall 206 of the first section 202 including side wall hinges 270 and 272, and the bottom wall 214 of the second section 204 including side wall hinges 271 and 273.

By merely moving or hinging the end channel members and vertical edge support channels along the hinges mentioned hereinbefore of each section, the end channel members can be made to fold outwardly thereby causing the end walls of each of said sections to fold outwardly. The side walls of each of said sections can be moved toward each other by folding along hinges 270, 272, 271 and 273 while the bottom walls of each of said sections are folded along the bottom hinges 266 and 268, respectively, so that the bottom walls of each of said sections form an inverted V as shown in FIG. 9C. This folding action is shown in FIGS. 9B–9D which illustrates the first section 202 (not including end wall 212) in its partially folded position. As seen in FIG. 9B, the side walls 210 and 208 are partially folded upwardly along hinges 272 and 270, respectively, and the central bottom wall hinge 266. As seen in FIG. 9D, the end wall 212 of the first section 202 is folded outwardly along hinges 263 and 261 and central end wall hinge 262 (a partial top view of which is shown in FIG. 9E). It will be apparent that the second section 204 may be folded in a similar manner.

FIG. 9F shows a side view of the carrier 200, including first and second sections 202 and 204, in its collapsed or folded position for easy handling and storage.

FIG. 9A is a plan view of the bottom surface of carrier 200 including first and second sections 202 and 204 and shows the hinge arrangement of section 202 as well as the corresponding side wall hinges 271 and 273 the bottom wall hinge 268 and the end wall hinge 264 of the second section 204.

Each of the first and second sections 202 and 204 will include in the bottom walls 206 and 214, respectively, thereof a flap 278 which will overlap the hinges 266 and 268 of the bottom walls 206 and 214 so that when the bottom walls are in their flat position, the hinges are immobilized and will not move either upwards or downwards and the flap will prevent moisture from seeping through the bottom hinges.

Figure 7:
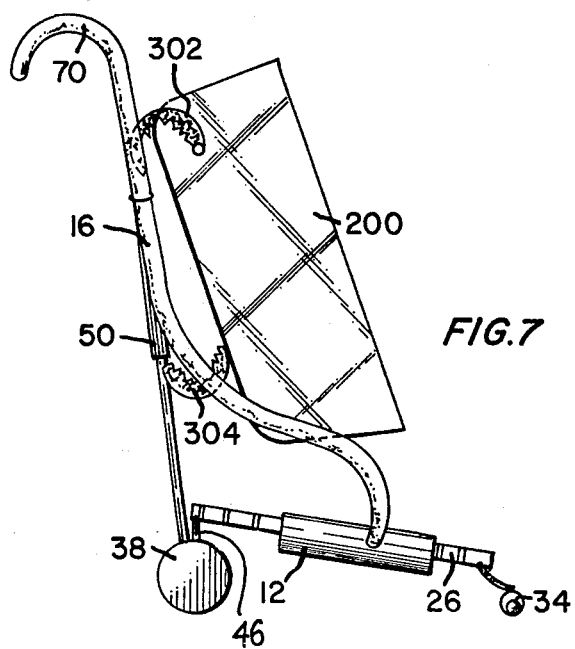

As seen in FIG. 9, the carrier 200 will also include means for securing the carrier 200 to the frame 10 as shown in the previous Figures. Such means may comprise a plurality of hook or arc-shaped portions or brackets, namely 302, 304, pivotally secured to the side walls of the first section 202, and 306 (and 308 not shown for purposes of drawing clarity) preferably are pivotally secured to the bottom walls for example to the channels 246 and 248 of the second section 204 of the carrier 200. Each of the securing means 302, 304, 306 and 308 will include a plurality of teeth which are adapted to engage studs or other conventional means disposed on the frame at various positions along the secondary support members 14 and 16. In fact, if desired, the bottom and side walls of the carrier 200 may include a plurality of fastening means adapted to retain the arc-shaped brackets so that the position of the arc-shaped brackets may be varied as desired. In this manner, the carrier 200 can be secured to and positioned on the secondary support members 14 and 16 in any manner, at any angle or tilt with respect to the frame 10 and horizontal as shown in FIGS. 5 to 7.

Figure 10:
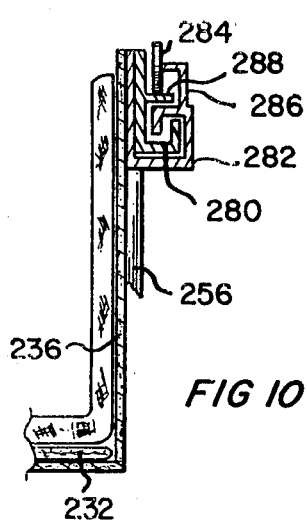
FIG. 10 is a partial end view of baby carrier means shown in FIG. 9 which also includes a pair of track or channel members for engaging each of the sections of such baby carrier means with each other.
Figure 11:
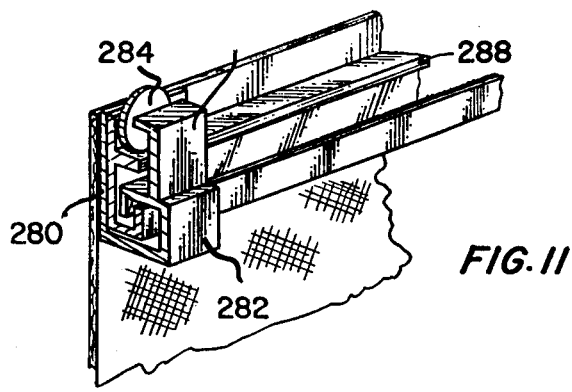
FIG. 11 is a perspective view of a portion of the baby carrier means shown in FIG. 10.

A further feature of the carrier 200 in accordance with the present invention is the inclusion of means for aligning the sections 202 and 204 with each other and keep such sections in alignment regardless of the position of each section relative to the other. Such aligning means comprises a track member 280 connected to the upper side channel 222 of the first section 202, as shown in FIG. 10, and a second track member 282 connected to the upper side channel 242 of said second section 204, which first and second track members are adapted to engage each other as shown in FIGS. 10 and 11 to facilitate positioning and aligning of the first section with respect to the second section. The track members 280 and 282 run along substantially the entire length of the side channel members 222 and 242, respectively.

The other side channel members 224 and 244 of the first and second sections 202 and 204, respectively, may also include similar track members to serve for aligning of the two sections with respect to each other.

In addition, the second track member 282 may include a bearing member 284 connected to the channel 242 (or second track member 282) by means of connecting member 286, which bearing member is adapted to be slidably or rotatably moved along a third track member 288 disposed on either the first track member 280, as shown in FIGS. 10 or 11, or on the side channel 222 of the first section 202. The bearing member 284 is adapted to ride on the track member 288 when members 280 and 282 of each of said first and second sections are engaged with each other. This further enables alignment of the two sections with respect to each other.

Figure 12:
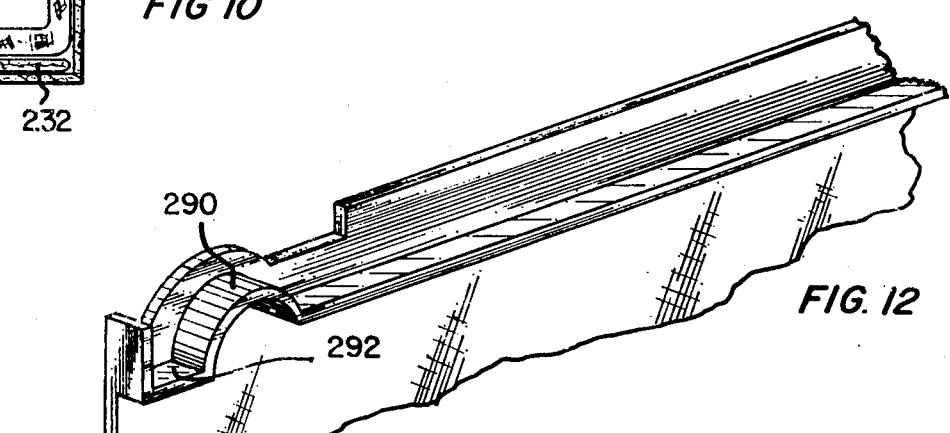
FIG. 12 is a perspective view of a portion of the baby carrier means shown in FIG. 11.

The track member 288, as shown in FIG. 12, may terminate in a raised arc-shaped track portion 290 which itself, terminates in a lowered or recessed track portion 292. The function of these raised and lowered portions of the track member 288 is as follows. When the first and second sections 202, 204 are slidably moved within the track members 280 and 282 away from each other, to their out position so that vertical edge support channels 234 and 240 are in close proximity to corresponding channels 254 and 260, that is to the baby holding position, the bearing member 284 will move along the track 288 over the hump or arc-shaped portion 290 and will lodge in the lower portion 292 of the track 288. This will fix the position of the two sections relative to each other and will also cause the second section 204 to drop slightly so that the bottom wall thereof will be aligned with the bottom wall 206 of the first section 202 and thereby present a substantially flat bottom surface for the baby.

The first and second sections 202, 204 may be further locked to each other by means of catch lock 700, shown in FIG. 9 or other conventional lock means. Such lock means will prevent undesired movement of the sections 202 and 204 with respect to each other.

Figure 13:
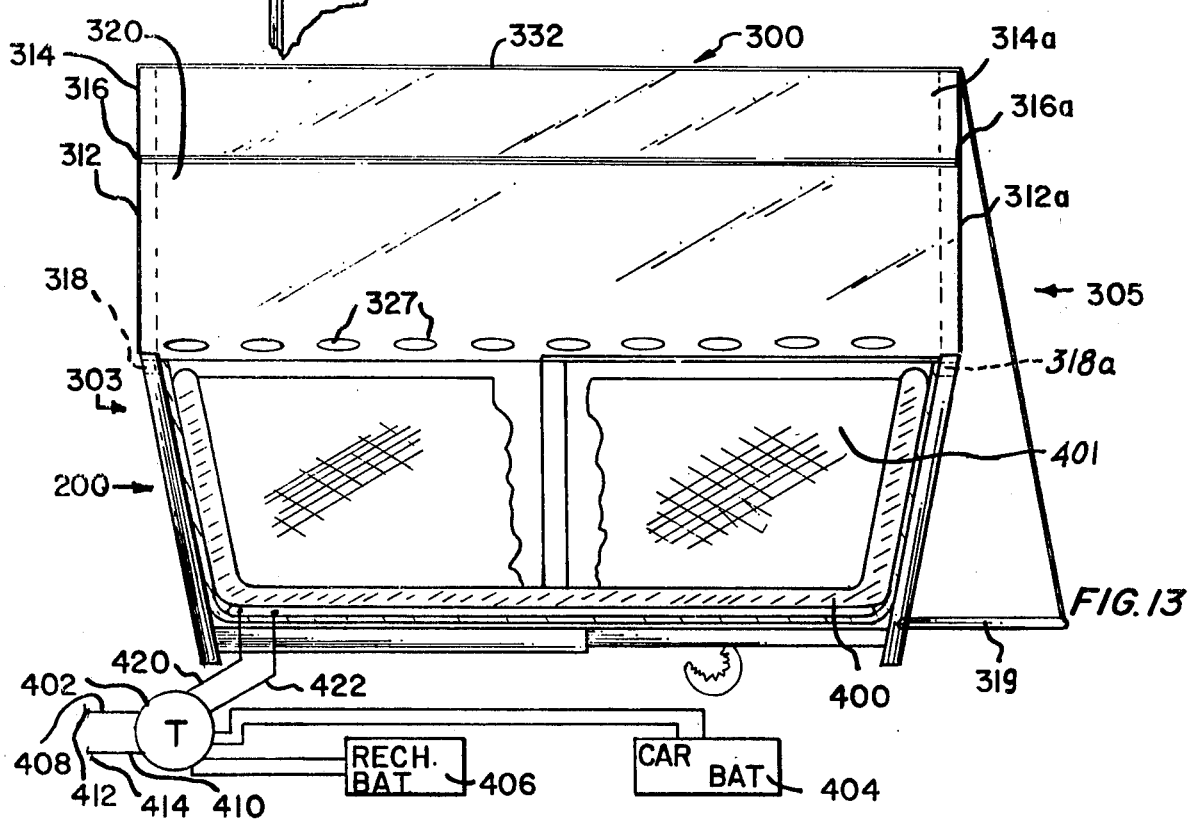
FIG. 13 is a side view of the baby carrier means shown in FIG. 9 including in addition shielding means for covering such carrier means, as well as means for heating said carrier means.

The baby carrier means as shown in FIGS. 9 and 13 will be equipped with a mattress 400 which is adjustable to fit the carrier means 200 including the bottom surface thereof regardless of the length of the baby carrier means. The mattress 400 may comprise a pad which can be folded as desired to form a mattress of desired length.

The baby carrier 200 may also include heating means for heating the mattress 400 which means may comprise a plurality of heating elements disposed within the mattress as shown in FIG. 13. The heating elements of the mattress may be connected directly to any current source, such as in a house, car, or other means. For example, the heating elements may operate off an automobile battery 404 and in such case may be connected via wires 420 and 422 to a transformer 402, which in turn, may be plugged into a cigarette lighter of an automobile. The transformer 402 may also be hooked up to a rechargeable battery 406 which functions as an independent voltage source. If desired, the transformer may also include wires 408 and 410 leading directly from the transformer and having plugs 412 and 414, respectively, at the ends thereof, so that the transformer can be directly connected to a current supply.

The sides and ends of the baby carrier means 200 may include pads 401 which are adjustable depending upon the length of the baby carrier means, that is, upon how far the first section 202 is moved into and disposed in second section 204.

The space between the overlapping side edges of the telescoping portions of the first and second sections 202, 204 of the carrier means 200 may include insulating material such as gasketing material or sponge material to make the two sections water-tight and wind resistant.

The carrier means 200 will also include shielding means for protecting the baby, which shielding means is generally referred to by the numeral 300, in FIG. 13. The shielding means 300 may comprise any conventional type of canopy or other type shielding or protective means formed of canvas, fabric, metal, plastic, and the like, which may be hingedly connected to one or both of said first and second sections 202 and 204.

As shown in FIGS. 13 to 16, the shielding means 300 may comprise two or more sections which are removably connected to each other and to the first and second sections 202 and 204 of the carrier 200.

A preferred shielding means in accordance with the invention is disclosed in FIGS. 13 through 16 and comprises two sections identified by the numerals 302 and 304 which are of a pliable material such as a fabric or like material. The sections 302, and 304 are secured to the carrier 200 by snaps, clamps, hinges, zippers or other conventional means.

As shown, the section 302 of the shielding means 300 includes at a first end 303, support members 306 and 308 which are hingedly connected to each other via hinge 310, support member 306 being hingedly connected via hinge 311 to vertical channel member 238 of the first section 202 of carrier 200. The section 302 of the shielding means 300 includes at the other end 305 thereof, similar support members 306a and 308a hingedly connected to each other and to the vertical channel member 258. The section 304 of the shielding means 300 includes at a first end 307, support members 312 and 314 which are hingedly connected to each other via hinge 316, support member 312 being hingedly connected via hinge 318 to vertical channel member 236 of the first section 202 of carrier 200. The section 304 includes at the other end 309 thereof similar support members 312a and 314a hingedly connected to each other via hinge 316a and to the vertical channel member 256.

The shielding means 300 also includes a protective covering 320 which is secured in any conventional manner to the support members 306, 308 and 306a and 308a, the latter two members not being shown for purposes of drawing clarity and a protective covering 321 which is secured to support members 312, 314 and 312a and 314a, in any conventional manner. In addition, the protective covering 320 will include end covering flaps 322, 322a at each of ends 303 and 307, respectfully, thereof as well as similar covering flaps at the ends 305 and 309 thereof. Thus, when the protective coverings are in their open and shielding disposition, as shown in FIGS. 13 and 16, the end covering flaps will cover and close off the end portions of the shielding means 300.

The sections 302 and 304 of the protective or shield device 300, when in their open shielding position, can be joined together by any conventional means such as by zippers, snaps, clamps hinges and the like. As shown in FIG. 13, the sections are joined together by three zippers including side zippers 330 and 330a (not shown) and top zipper 332.

As shown in FIG. 13, one end of the protective cover 300 may overlap an end of the baby holding device; such cover end being supported at the overlapping end by support member 319 which is hingedly connected to a corresponding end of the baby holding device 200. The overlapping end of the cover 300 may be employed to protect the baby's feet when the baby holding device is employed as an infant seat as shown in FIG. 6 or when the baby carrier 200 is removed from the frame 10 and employed as an infant seat as described hereinafter.

It will also be appreciated that the protective cover 300 will also include air holes 327 as shown in FIGS. 14 and 15 (or other conventional means) to allow circulation of air into and out of the protective cover.

The shielding device 300 including the two sections 302 and 304 thereof can be easily disconnected from the hinges 311, 311a (not shown), 318 and 318a where the baby carrier of the invention is employed indoors, in an automobile or even outdoors, where desired.

Where it is desired to move the shielding device from its down position as shown in FIG. 14 to its shielding position as shown in FIGS. 13 and 16, the sections 302 and 304 are raised and pivoted about the hinges 311, 311a, 318 and 318a as well as pivoted about the hinges 310, 310a, 316 and 316a to the position shown in FIG. 15 and finally to the position shown in FIGS. 13 and 16 until the longitudinal edges 340 and 342 of sections 302 and 304, respectively, are in abutting relation to each other as shown. The zippers 330, 330a and 332 can then be employed to secure the sections 302 and 304 to each other.

As indicated above, the portable baby holding device shown in the Figures and described hereinbefore may serve many different functions and is convertible into a baby carriage, stroller, infant seat, car seat, car bed, bassinet, high chair and the like. For example, where the portable baby holding device of the invention is to serve as a car bed, the baby carrier means 200 will be lifted out of the frame 10 and may serve, as such, as a car bed.

Figure 8:
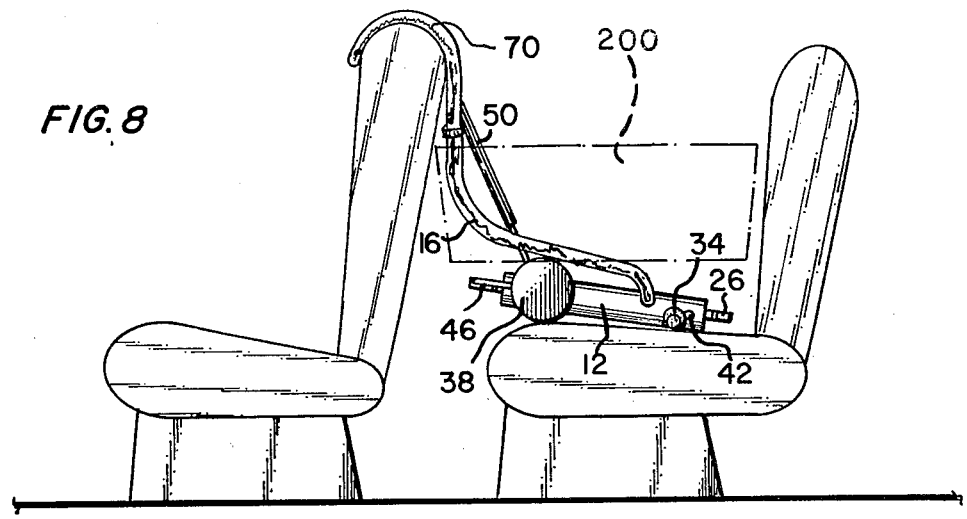
FIG. 8 is a side view of the collapsible frame and baby holding means shown in FIG. 1, attached to the back of an automobile seat.

If desired, the baby carrier means 200 need not be lifted out of the frame 10 and the frame may be partially collapsed and still serve to support the baby carrier means employed as a car bed. In such case, the front wheels 32 and 34 may be pivoted towards the primary support member 12 so as to assume a position as shown in FIG. 8. The release mechanisms 92 and 102 can then be activated so as to allow movement of the secondary support members 14 and 16 so as to lower such members into a position such as shown in FIG. 8. At the same time, the cross members 48 and 50 may be partially collapsed so as to reduce its length by merely telescoping the secondary rod-like member into the primary tubular member of each of said cross members 48 and 50, into a position such as shown in FIG. 6. The back wheels 36 and 38 may also be pivoted towards the primary support member so as to assume a position such as shown in FIG. 6. In addition, the wheel support member 26 may be moved so that the front end thereof 28 moves towards the primary support member so that said wheel support member 26 will be moved out of the way of the back rest of a rear seat of an automobile such as shown in FIG. 6. The release mechanism 92 may then be deactivated or locked so that the secondary support members 14 and 16 are fixed at a desired angle to the primary support member 12 such as shown in FIG. 6. As seen in FIG. 8, a portion of the secondary support members 14 and 16 present a substantially horizontally disposed support for the baby carrier means 200. The carrier means 200 is attached via brackets 302, 304, 306, 308 to corresponding pins or studs on the secondary support members 14 and 16 so that said carrier means 200 assumes a substantially horizontal position as shown in FIG. 5. In this manner, carrier means 200 and frame 10 can function as a car bed and be supported by the rear automobile seat and the back rest of the front automobile seat by means of the hooks 68 and 70.

Where it is desired to employ the portable baby holding device of the invention as a baby carriage, the frame 10 is disposed such as shown in FIG. 1 as well as in FIG. 5. The baby carrier means are then connected to the secondary support members 14 and 16 via brackets 302, 304, 306, and 308 as shown in FIG. 5 so that the baby carrier means assumes a substantially horizontal attitude.

Futhermore, in accordance with the present invention, the portable baby holding device which is disposed so as to function as a car bed or baby carriage may also function as a bassinet.

Where it is desired to convert the baby holding device into an infant seat, the baby carrier means will be positioned on the frame 10 and secured to the secondary support members 14 and 16 by means of the brackets 302, 304, 306, and 308 so that the bottom of the baby carrier means assumes an angle of about 15° to 30° to the horizontal, as shown in FIG. 6.

Where it is desired to employ the baby holding device of the invention as a stroller, the baby carrier means can be connected to the frame 10 by securing the baby carrier means via the brackets 302, 304, 306 and 308 to the secondary support members 14 and 16 so that the carrier means assumes a substantially vertical angle to the ground, as indicated in FIG. 7. In this position, the baby will sit in the baby carrier means with his back against the bottom wall of the baby carrier means and with his bottom resting on an end wall and with his legs extending over the end wall.

The baby holding device may be employed as a car seat by partially collapsing the frame 10 as described hereinbefore and as shown in FIG. 8 and then securing the baby carrier means to the secondary support members 14 and 16 of the frame 10 as shown in FIGS. 5 and 8.

Where it is desired to employ the baby holding device as a highchair, the release mechanism 102 is activated and the wheel support member 26 is moved towards the front of the device so that the back portion 30 of the wheel support member 26 is disposed in close proximity to the back portion of the primary support member 12. The cross members 48 and 50 will then be extended to increase its length while the secondary support members 14 and 16 will be raised (by activating the release mechanism 92) to a position so that such support members can support the baby carrier means 200 with the top portion of such baby carrier means 200 reaching table height. The baby carrier means will, of course, be employed in a substantially vertical position as shown in FIG. 7.

Where it is desired to collapse the frame 10 from its position as shown in FIG. 1 into its collapsed position as shown in FIG. 3, the third cross member 60 is merely collapsed toward the hooks 68 and 70, the release mechanism 92 is activated and the secondary support members 14, 16 are moved toward each other. This action causes the cross members 48 and 50 to close in a scissor-like movement while causing the back wheel connecting rods 44 and 46 to move the back wheels 36 and 38 upwardly and forwardly against the primary support member 12. The front wheels are pivotally moved backwardly against the primary support member 12.

The cross members 48 and 50 may also be collapsed by opening the screw member 72 and telescoping each of the tubular members and rod-like members of the cross members 48 and 50 inwardly.

In order to open the frame 10 from the position shown in FIG. 3 to that shown in FIG. 1, the secondary support members 14 and 16 are moved away from each other thereby causing the back wheels 36 and 38 to drop away from the primary support member 12 into their load supporting position. The front wheels 32 and 34 are also lowered into their load supporting position. Thereafter, the cross members 48 and 50 may be telescoped outwardly to raise the secondary support members 14 and 16 to a desired height. The third cross member 60 is closed to assume the support or bracing position shown in FIG. 1.

It will also be appreciated that the baby carrier 200 shown in the Figures may be removed from the collapsible frame 10 and be employed as an infant seat. For example, as seen in FIG. 9, the baby carrier 200 can be fashioned with a pair of telescoping support rods, each rod (210a, 210b) of such pair being connected, for example, to the bottom of vertical edge support channels 236 and 238 or to lower side channels 226 and 228 of the first section 202 (the latter embodiment being shown in FIG. 9) (or to equivalent structure of the second section 204). The telescoping rods may be of any conventional construction such as of two piece construction with associated locking knob (similar to the cross members 48 and 50) of FIG. 1 and may be employed to support the baby carrier 200 at any desired inclined position depending upon the length that the support rods are fixed. It will be apparent that while the telescoping rods would support one end of the baby carrier 200, the other end would be supported by lower end channel 252 and/or the ends of the vertical edge support channels 256, 258 of the second section 204.

The telescoping rods may be completely collapsed and even removed where the baby carrier 200 is connected to the collapsible frame 10.

What is claimed is:

1. A collapsible portable baby holding device comprising a first section and a second section, each of said sections including a bottom wall for supporting a baby, a pair of side walls and at least one of said sections including an end wall, said first section being adapted to be longitudinally telescopically positionable within said second section with the bottom walls of each being in telescopingly overlapping or contiguous relationship, the side and/or end walls of each of said first and second sections including a vertically-disposed hinge for collapsing said end walls, and a pair of vertically-disposed hinges connecting each of said side and/or end walls to said side and/or end walls, respectively.

2. The baby holding device as defined in claim 1 wherein the bottom walls of each of said first and second sections include a hinge disposed substantially parallel to but spaced from the side walls of said sections for folding or collapsing said bottom wall upwardly toward said side walls.

3. The collapsible baby holding device as defined in claim 2 wherein the bottom wall of said first section and the bottom wall of said second section include a flap portion which overlaps said hinge disposed in said bottom wall.

4. A collapsible portable baby holding device comprising a first section and a second section, each of said sections including a bottom wall for supporting a baby, a pair of side walls and at least one of said sections including an end wall, said first section being adapted to be longitudinally telescopically positionable within said second section with the bottom walls of each being in telescopingly overlapping or contiguous relationship, said first and second sections further including a pair of track or channel members connected to said side walls of each, the track members of said first section being adapted to be engaged in and move along the track members of said second section to facilitate positioning of one of said sections with respect to the other.

5. The collapsible baby holding device as defined in claim 4 wherein at least one of said track members of said first or second sections includes a second track and the other of said second or first sections includes a bearing member adapted to ride on said second track when the track members of said first and second sections are engaged with each other.

6. The collapsible baby holding device as defined in claim 5 wherein said second track includes a raised portion and a lowered portion connected to said raised portion so that when said sections are in their telescoped out positions with respect to each other, the bearing member of one of said sections has travelled over the raised portion of said track means of said other section and is resting on the lowered track portion to thereby inhibit accidental movement of said sections with respect to each other and ensure that the bottom walls of said sections are aligned with each other to present a substantially flat bottom surface for the baby to lie on.

7. The collapsible baby holding device as defined in claim 6 wherein said bottom wall of said first section is disposed below the bottom wall of said second section and said track means is disposed on said second section and said bearing member is disposed on said first section.

8. A collapsible portable baby holding device comprising a first section and a second section, each of said sections including a bottom wall for supporting a baby, a pair of side walls, and at least one of said sections including an end wall, said first section being adapted to be longitudinally telescopingly positionable within the side walls of said second section so that the bottom walls can be moved from telescopingly overlapping position to an adjacent position.

9. The collapsible baby holding device as defined in claim 8 further including shielding means for protecting the baby, movably connected to said first section and/or said second section.

10. The collapsible baby holding device as defined in claim 9 wherein said shielding means comprises a canopy hingedly connected to one or both of said first or second sections.

11. The collapsible baby holding device as defined in claim 9 wherein said shielding means comprises at least two sections adapted to be removably connected to each other and to said first and second sections.

12. The collapsible baby holding device as defined in claim 11 wherein each end of said sections of said shielding means comprises two pair of hingedly connected support members hinged to each other and one of which members of each pair thereof is hinged to said first or second sections respectively of said holding device.

13. The collapsible baby holding device as defined in claim 12 wherein said attaching means comprise a single zipper means.

14. The collapsible baby holding device as defined in claim 8 including portable heating means for heating the interior of said baby holding means, said heating means being adapted to be connected to a current source located in a house or vehicle.

15. The collapsible baby holding device as defined in claim 14 wherein said heating means comprises a heated pad or mattress.

16. The collapsible baby holding device as defined in claim 9 further including adjustable means connected to said first or second section, said adjustable means being adjustable in length and adapted to support said first and/or second sections at a desired inclined position.

17. The collapsible baby holding device as defined in claim 16 wherein said adjustable means comprises a pair of telescoping support rods connected to said first or second sections, said telescoping support rods being adjustable in length and adapted to support said first and/or second sections at a desired inclined position depending upon the length that said telescoping support rods are fixed.

18. A baby holding device comprising collapsible baby carrier means and adjustable means connected to said baby carrier means, said adjustable means being adjustable in length and adapted to support said baby carrier means at a desired inclined position.

19. The baby holding device as defined in claim 18 further including shielding means for protecting the baby, said shielding means being connected to said baby carrier means and adapted to move between an open unprotecting position and a closed protecting position, said shielding means including means for supplying air for said baby, said shielding means further comprising a plastic or fabric.

20. The baby holding device as defined in claim 18 further including a collapsible body support frame for supporting said baby carrier means, and a body portion supported on said body support frame, said body support frame being adapted to be connected to a separate collapsible frame assembly.

21. The baby holding device as defined in claim 18 further including a pair of telescoping support rods connected to said baby carrier means, said telescoping support rods being adjustable in length and adapted to support said baby carrier means at a desired inclined position depending upon the length that said telescoping support rods are fixed.

22. The collapsible baby holding device as defined in claim 4 further including securing means for movably securing said body portion in any desired position on a separate frame assembly.

23. The baby holding device as defined in claim 20 wherein said body support frame comprises end wall and side wall support members and further including securing means connected to said body support frame for connecting the body support frame to a separate frame assembly.

24. The baby holding device as defined in claim 23 wherein said securing means comprises at least one bracket connected to side and/or bottom corners of said body support frame, said brackets being adapted to engage corresponding baby holding device support members connected to a separate frame assembly.

25. The baby holding device as defined in claim 24 wherein said securing means is arc-shaped and includes a plurality of teeth along said arc for securing said baby holding device to said separate frame assembly at any desired angle thereto.

* * * * *